Dec. 9, 1969 J. J. ROYER 3,483,402

QUARTZ CRYSTALS FOR PIEZOELECTRIC RESONATORS

Filed Feb. 26, 1968 2 Sheets-Sheet 1

INVENTOR
J. J. ROYER
BY [signature]
ATTORNEY 3,483,402

QUARTZ CRYSTALS FOR PIEZOELECTRIC RESONATORS

James J. Royer, Hanover Township, Northampton County, Pa., assignor to Bell Telephone Laboratories, Incorporated, Murray Hill, N.J., a corporation of New York Filed Feb. 26, 1968, Ser. No. 708,355
Int. Cl. H02n 7/00
U.S. Cl. 310—9.5 3 Claims

ABSTRACT OF THE DISCLOSURE

The specification describes quartz crystals for piezoelectric resonators especially useful in the frequency range of 850 kHz. to 3 mHz. The crystals are oriented at (*yzw*) −51°/0°/0° and have length-to-width ratios of at least 50.

This invention relates to novel piezoelectric-quartz crystals. Over the frequency range of about 1 kHz. to 150 mHz., quartz resonators are the principal means of precise frequency control and selection in commercial systems. Between 1 kHz. and 1 mHz., resonators vibrating in flexure, extensional, and width shear are principally employed. Above 1 mHz. the thickness-shear vibrators are used. However, there exists no smooth continuous transition from low frequency width-shear resonators to high frequency thickness-shear resonators. In the frequency range of 850 kHz. to at least 3 mHz., the low frequency resonators become impractically small with respect to their mounting systems, while the high frequency resonators are required to be impractically large to approximate the performance of an infinite plate designed in accordance with "trapped energy" principles. That performance is characterized by maximum suppression of unwanted modes (usually >.30 db-down) plus both a high and stable Q (>50,000) over the usual operating temperature ranges. In practical terms, an infinite plate means that the dimension in the direction of the shear wave displacement must be considerably greater (greater than 50 times) than the dimension in the direction of the shear wave propagation. Thus, a 6 mHz. AT plate which would have a thickness of about 0.28 mm. (thickness=1.660 mHz. mm.÷frequency in mHz.) requires a diameter of 15 mm. or more to be essentially an infinite plate. Similarly, a 3 mHz. plate would have to be greater than 30 mm. in diameter, and a 1 mHz. plate, greater than 90 mm. diameter. Very few AT resonator designs with diameters greater than 15 mm. are in production because large quartz plates are uneconomical. The usual approach to the design of thickness-shear resonators, below 6 mHz. is to contour the plate such that the diameter-thickness cross section is plano-convex, double-beveled or bi-convex. This result, at best, is a compromise in the electrical characteristics, usually between the strength of the unwanted modes and the stability of Q with temperature. For oscillator applications the strengths of the unwanted modes usually are of little importance, but for filter applications, and particularly for band elimination filters, the maximum suppression of unwanted modes plus the highest and most stable Q versus temperatures are essential.

It has been found that with rectangular DT resonators the length of the quartz plate can be increased from its normal length of 2.5 times the width without degrading any of the electrical characteristics of the design. In fact, if the length is increased to greater than 10 times the width, the plate vibrations may be considered to be similar to those in a narrow slice from an AT plate; with the width and thickness of the DT plate being analogous to the thickness and width of an AT resonator. Preliminary work in the regions of *l*/*w* of 25 to 40 indicates that the Q's of the DT resonators are very unstable with temperature. For this reason useful crystals having low *l*/*w* ratios would be difficult to make.

However, it has now been found that if the *l*/*w* ratio exceeds 50 to 1 an especially useful crystal plate results.

These and other aspects of the invention may become more apparent from a consideration of the following detailed description.

Figure 5:
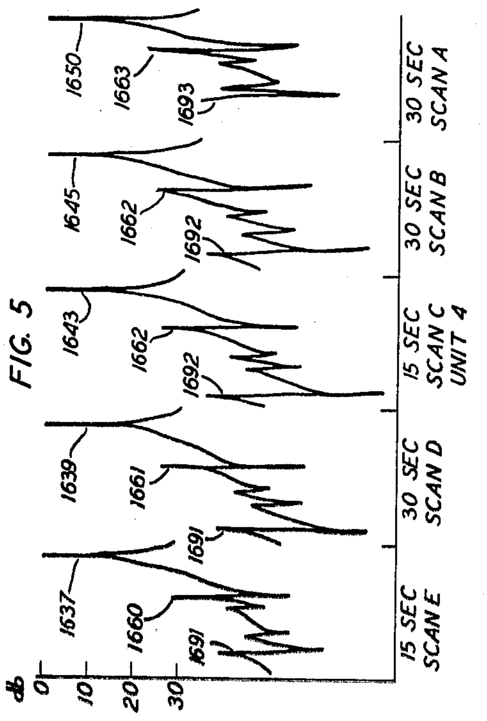
Figure 6:
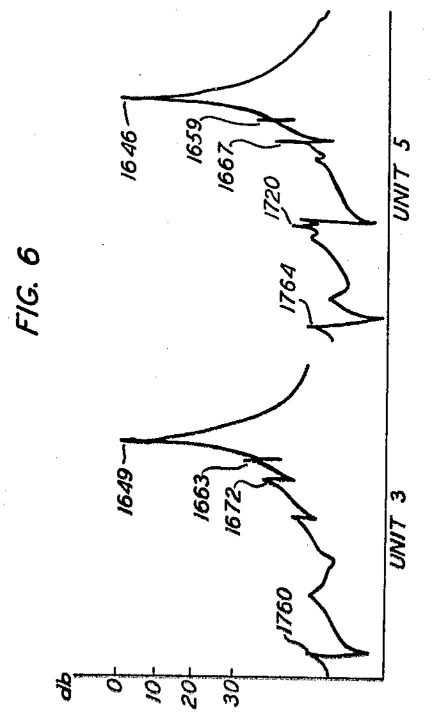
Figure 4:
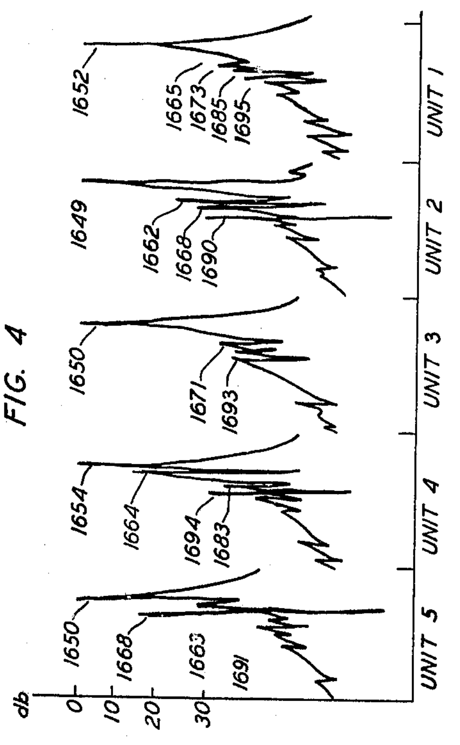

FIG. 4 compares five plots of attenuation in db versus frequency for five sample crystals made in accordance with the invention;

FIG. 5 is a series of plots similar to those of FIG. 4 giving corresponding data for crystal units mass loaded by electroplating; and FIG. 6 is a plot similar to FIGS. 4 and 5 for two samples having electrode lengths differing from that of the previous crystal samples.

Various angles of orientation were studied to locate the zero frequency-temperature coefficient around 25° C. The correct orientation for this temperature was found to be approximately −51°0′. The electrical characteristics of such plates are recorded, as well as design information which would yield 1 to 2 mHz. resonators having good suppression (>25 db) of unwanted modes, high Q and stable Q versus temperature. Although these plates are unusually long, there is a feasible way of mounting and packaging them, and they are useful in those applications (e.g., band elimination filters) where no compromise or trade-off in electrical characteristics can be tolerated.

The crystal plates used in this investigation were cut to the following orientation and dimensions:

Orientation (*yzw*)−51°/0°/0°
*l*=2.2150 inches=26.261 mm.
*w*=0.0399 inch=1.0135 mm.
*t*=0.100 inch=0.254 mm.

The orientation designation is per the IRE standards published in Proceedings of the I.R.E., vol. 37, No. 12, pp. 1378–1395, December 1949.

A five micron finish was placed on the major surfaces and the major edges, and a D400 diamond wheel finish on the minor edges.

The crystal plates were cleaned and etched. They were then silver spotted and electroded as shown in FIG. 1.

Figure 1:
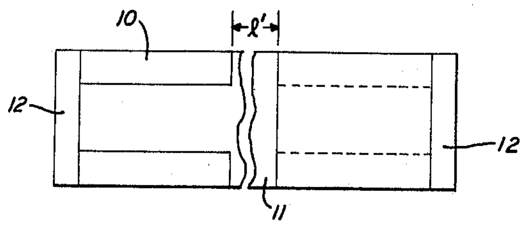
FIG. 1 is a plan view of a quartz crystal plate made in accordance with the invention.

In FIG. 1 the quartz crystal plate having a *l*/*w* ratio of at least 50 is electroded with a gold electrode 11. Fired silver paste 12 is applied to the ends of the crystal. The length of the electrode 11 (dimension *l*′ is 0.5 inch).

Figure 2:
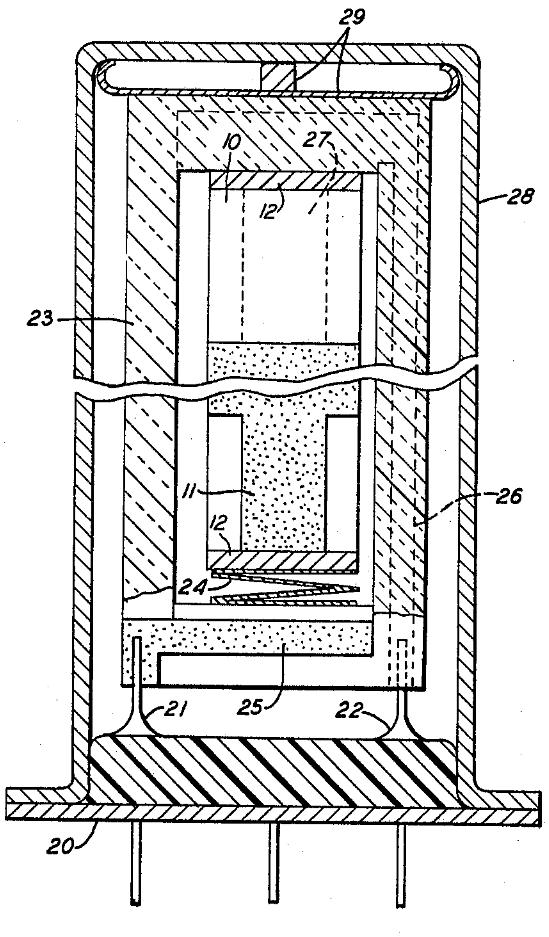
FIG. 2 is a front elevation of the packaged crystal plate embodying the novel crystal of this invention.

FIG. 2 shows a device incorporating a crystal such as that of FIG. 1. The base of the device is an "A" size header, 20. Supported on the pins 21 and 22 of the header is a rectangular ceramic frame 23. The crystal plate 10 is soldered to the upper arm of the frame and engages the lower arm through a conductive W-spring 24. The ceramic frame is metalized at 25 to provide contact between the electrode pin 21 and the electrode 11 on the crystal plate. The frame is metalized at 26 to connect electrode pin 22 with the electrode 27 shown in phantom. Electrode 27 is symmetical to electrode 11 but on the obverse side of the crystal. The assembly is encased in an evacuated closure 28 with the ceramic frame held in place by a Phosphor-bronze spring 29.

Five resonators were fabricated as decribed above and their electrical characteristics were measured. The nominal frequencies ranged from 1.649 to 1.654 mHz.; the static capacitance with the enclosure grounded was 2.3 to 2.4 pf.; and the motional inductance varied from 1.3 to 1.5 h. From these values, and those from several other but pertinent designs, the following constants were calculated:

Frequency constant ($f \times w$): 1672 kHz. mm.
Inductance constant ($L/t$): 73 $w/l'$ h./mm.
Ratio of capacitance ($C_0/C_1$): $\sim$355

The crystal units were then temperature scanned from 0° to 60° C. to determine both frequency and resistance variations with temperature. All resonators had zero frequency-temperature coefficients (or turnover points) within the range of 20° to 30° C. The parabolic constant evaluated from unit 3 was $1.2 \times 10^{-8}$ (°C.)$^{-2}$, which means that a frequency tolerance of ±.002 percent from 0° to 60° C. is feasible.

The resistance and Q variations with temperature are as follows:

| | Resistance (ohms) | $Q \times 10^{-3}$ |
|---|---|---|
| Unit: | | |
| 1 | 180 to 300 | 81 to 48. |
| 2 | 200 to 240 | 73 to 60. |
| 3 | 150 to 230 | 103 to 63. |
| 4 | 250 to 380 | 58 to 38. |
| 5 | 200 to 250 | 73 to 58. |

Figure 3:
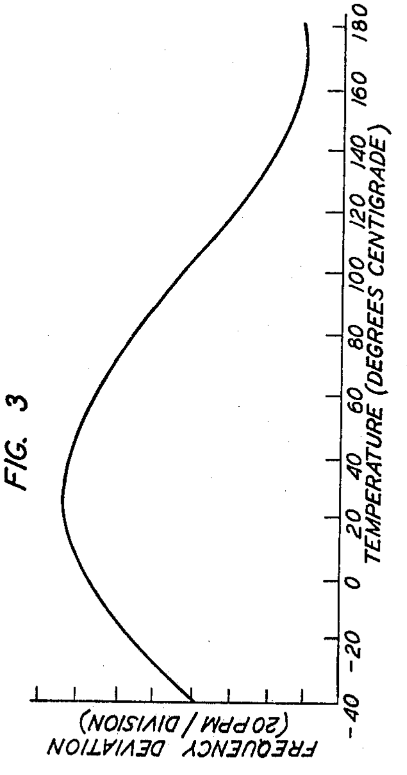
FIG. 3 is a plot of the frequency change versus temperature.

During temperature tests it was observed that the slope of the frequency curve was less above the turnover temperature than it was below. Unit 5 was therefore temperature tested over a wider range to determine whether a second turnover temperature existed. It was found at about 170° C. and verified by temperature testing unit 3 over the same range. The results are shown on FIG. 3. The inflection point of this curve occurs at about 95° C.

Several crystal units were then frequency scanned from 50 kHz. to 5 mHz. to determine the overall frequency response. No unwanted resonance stronger than 45 db were found between 50 kHz. and the main resonance nor between 1.8 mHz. and 4.93 mHz., which is the frequency of the third overtone of the main resonance. All models were then scanned between 1.6 and 1.8 mHz. The results are depicted in FIG. 4. The frequency in mHz. of each response is listed adjacent to the response. The scale below each scan is the attenuation level. All five units had unwanted modes suppressed 15 db or more while three of the five had suppression levels of 25 db.

Unit 4 was uncovered and electroplated in steps to determine the effects of mass loading on both the main and unwanted responses. The results are shown on FIG. 5. Scan A was made after the crystal had been backplated 4 kHz. (i.e., it was backplated 4 kHz. in addition to that resulting from base plating, which was about 4 to 5 kHz.) This reduced the unwanted mode level to 21 db. Subsequent backplating (for the incremental times listed) reduced unwanted mode level to 29 db. The best results occurred after the first minute of electroplating (scan A and B). Subsequent backplating (Scans C, D, and E) reduced both the unwanted mode level and the Q of the main mode so it is possible that further suppression was a result of the overall lowering of the Q of the resonator.

With this information at hand, unit 5 was electroplated at the same current level (3 ma.) for one minute with the result that the unwanted mode level was reduced to 25 db. It appears then that a backplating of approximately 0.6 percent (i.e., in addition to base plating, which was about 0.28 percent) can be utilized to suppress unwanted modes without appreciably degrading the Q of the resonator.

Two of the crystal plates were then stripped and reelectroded to a $l'$ dimension of 0.650 inch to determine the inductance variation as a function of electrode length. The new inductance was 1 henry which is consistent with an inductance constant of 73 $w/l'$ $H$/mm. The resistance and Q variations with temperature were:

| | Resistance (ohms) | $Q \times 10^{-3}$ |
|---|---|---|
| Unit: | | |
| 3 | 175 to 195 | 53 to 59. |
| 5 | 180 to 260 | 40 to 58. |

These units were temperature tested in air. Since there is approximately a 40 percent reduction in Q in air as determined from the first group, the Q in vacuum of these units would be 1.67 times higher than the above values.

Frequency scans of these two units are shown on FIG. 6. They indicate some improvement over the frequency scans of the crystals with 0.5 inch electrodes although the improvement may, in part, be due to a slightly heavier baseplating, estimated to be a backplating of 0.40 percent.

Various additional modifications and deviations can be devised by those skilled in the art to alter or improve the invention described above. All such variations which do not depart in spirit from the basic teachings through which the invention has advanced the art are properly considered to be within the scope of this invention.

What is claimed is:

1. A quartz crystal for use in a piezoelectric resonator comprising a quartz plate having a ($yzw$) orientation of approximately −51°/0°/0° and a length-to-width ratio of at least 50.

2. A piezoelectric resonator comprising a quartz plate having a ($yzw$) orientation of approximately 51°/0°/0° and a length-to-width ratio of at least 50, and means for mounting said plate at the ends thereof so as to absorb the energy of unwanted modes which propagate to the ends of the plate.

3. The resonator of claim 2 wherein the means for mounting the crystal includes a rectangular ceramic frame adapted to encompass the crystal, and crystal mounts at each end member of the frame for supporting the crystal.

References Cited

UNITED STATES PATENTS

| | | | |
|---|---|---|---|
| Re. 25,413 | 7/1963 | Sogn | 310—95 |
| 2,677,775 | 5/1954 | Font | 310—8.9 X |
| 2,969,471 | 1/1961 | Schneider | 310—8.9 |
| 3,334,251 | 8/1967 | Royer | 310—95 |

MILTON O. HIRSHFIELD, Primary Examiner

M. O. BUDD, Assistant Examiner

U.S. Cl. X.R.

310—8.9, 9.1; 331—158; 333—82